(12) United States Patent
de Vaan et al.

(10) Patent No.: US 10,192,352 B2
(45) Date of Patent: Jan. 29, 2019

(54) METHOD, DEVICE AND SYSTEM FOR SIMULATING SHADOW IMAGES

(71) Applicant: 3mensio Medical Imaging B.V., Bilthoven (NL)

(72) Inventors: Jan de Vaan, Houten (NL); Peter Heil, Utrecht (NL)

(73) Assignee: 3mensio Medical Imaging B.V., Bilthoven (NL)

( * ) Notice: Subject to any disclaimer, the term of this patent is extended or adjusted under 35 U.S.C. 154(b) by 8 days.

(21) Appl. No.: 15/658,018

(22) Filed: Jul. 24, 2017

(65) Prior Publication Data

US 2018/0033192 A1 Feb. 1, 2018

(30) Foreign Application Priority Data

Aug. 1, 2016 (EP) ..................... 16182125

(51) Int. Cl.
*G06T 1/20* (2006.01)
*G06T 7/10* (2017.01)
(Continued)

(52) U.S. Cl.
CPC ............ *G06T 15/60* (2013.01); *G06T 11/008* (2013.01); *G06T 15/506* (2013.01); *G06T 1/20* (2013.01);
(Continued)

(58) Field of Classification Search
None
See application file for complete search history.

(56) References Cited

U.S. PATENT DOCUMENTS 6,251,072 B1 6/2001 Ladak et al.
7,817,823 B1 * 10/2010 O'Donnell ............. G06T 15/60
345/426

(Continued)

FOREIGN PATENT DOCUMENTS

WO WO2012/080943 A1 6/2012

OTHER PUBLICATIONS

"A Novel Dedicated 3-Dimensional Quantitative Coronary Analysis Methodology for Bifurcation Lesions", Yoshinobu Onuma et al., EuroIntervention 2011:7:629-635.

(Continued)

*Primary Examiner* — Xin Sheng
(74) *Attorney, Agent, or Firm* — Gordon & Jacobson, P.C.

(57) ABSTRACT

A method is provided for simulating two-dimensional (2D) shadow images of an object (particularly an asymmetrical object), which comprises:
  a) obtaining a representation of the surface of said object;
  b) inputting a perspective viewing direction defining a virtual path line;
  c) calculating intersections between the virtual path line and the surface of the object;
  d) calculating the distance between couples of consecutive intersections;
  e) calculating simulated beam intensity attenuation between such couples of consecutive intersections from an input parameter related to the attenuation coefficient of the object and the distance as calculated in d); and
  f) displaying the simulated beam intensity attenuation as pixel brightness in a grey or color scale in the form of a shadow image.
A corresponding device, system and computer program are also disclosed.

20 Claims, 6 Drawing Sheets

(51) Int. Cl.
*G06T 11/00* (2006.01)
*G06T 15/50* (2011.01)
*G06T 15/60* (2006.01)
(52) U.S. Cl.
CPC ...... *G06T 7/10* (2017.01); *G06T 2207/10081* (2013.01); *G06T 2207/30101* (2013.01); *G06T 2210/41* (2013.01); *G06T 2211/404* (2013.01)

(56) References Cited

U.S. PATENT DOCUMENTS

| | | | |
|---|---|---|---|
| 8,787,641 | B2 | 7/2014 | Hof et al. |
| 9,008,386 | B2 | 4/2015 | Verstraeten et al. |
| 2010/0021025 | A1 | 1/2010 | Hof et al. |
| 2012/0207365 | A1* | 8/2012 | Verstraeten ............ G16H 50/50 382/128 |
| 2015/0282777 | A1 | 10/2015 | Compas |
| 2016/0110890 | A1* | 4/2016 | Smith .................. G06T 11/001 382/128 |

OTHER PUBLICATIONS

"Marching Cubes: A High Resolution 3D Surface Construction Algorithm", Computer Graphics, vol. 21, No. 4, Jul. 1987.
"Model-Based Segmentation of Cardiac and Vascular Images", WJ Niessen et al., 2002 IEEE International Symposium on Biomedical Imaging 2002, pp. 22-25.
"OpenGL Programming Guide", Eighth Edition, The Official Guide to Learning OpenGL, Version 4.3, Dave Shreiner et al., Chapter 4, pp. 141-204.
"Robust CTA Lumen Segmentation of the Atherosclerotic Carotid Artery Bifurcation in a Large Patient Population", Manniesing et al, Medical Image Analysis 14 (2010), pp. 759-769.

* cited by examiner

METHOD, DEVICE AND SYSTEM FOR SIMULATING SHADOW IMAGES

CROSS-REFERENCE TO RELATED APPLICATIONS

The present disclosure claims priority from EP Patent Application No. EP16182125, filed on Aug. 1, 2016, herein incorporated by reference in its entirety.

BACKGROUND OF THE INVENTION

1. Field

The present disclosure relates to a method, device and system for calculation and visualization of shadow images of an object of interest.

2. State of the Art

Angiography is a commonly used imaging modality performed to image and diagnose diseases of the blood vessels of the body, including the brain and the heart. In cardiology and radiology two-dimensional (2D) angiography is a medical imaging technique used to visualize the inside, or lumen, of blood vessels and organs of the body, with particular interest in the arteries, veins, and the heart chambers by injecting a radio-opaque contrast agent into the blood vessel and imaged using X-ray based techniques such as angiography or fluoroscopy. Radiologists, cardiologists and vascular surgeons used two-dimensional X-ray angiography to guide interventional treatment of blood vessels or the heart. 2D angiographic X-ray images are the result of X-ray transmission from the X-ray source through the body of the patient arriving at the detector. The detected amount of X-ray per pixel at the detector plane relates to the density of the tissue on the path between source and detector and is visualized as brightness in a greyscale 2D image. Such images, based on transmission through semi-transparent objects, are frequently identified as shadow images. These shadow image are inherently 2D images and lack depth information of the visualized structures, i.e. information that describes the object as a function of position in the space between the X-ray source and detector plane.

For both diagnosis and treatment, procedure time can be reduced and care quality can be improved by preparing the intervention based on previous acquired volumetric imaging methods, such as computed tomography (CT) or Magnetic Resonance imaging (MM) which produce three-dimensional (3D) volumetric datasets. A 3D volumetric data consists of an amount of voxels that cover the 3D volume. Segmentation and rendering based on this 3D volumetric data can produce an image that provides much more accurate description of the 3D object than 2D shadow images. This technique is widely used in the medical society.

Nevertheless, to facilitate proper understanding on how an object appears when visualized with a 2D imaging technique, e.g. X-ray angiography as used during the interventional treatment procedure, a simulated 2D angiographic image can be generated based on the original 3D volumetric image dataset.

In 2D X-ray angiography, the physician can choose the projection angle for the X-ray images. A simulated 2D angiographic image can be used to allow physicians to simulated the 2D angiographic X-ray image from different perspectives and as such predict which projection angles during the 2D X-ray angiography procedure will produce a good view of the anatomy of interest. The physician can compare options for the projection angles ahead of time, which may reduce radiation dose and procedure time.

An example of such simulation solutions is known by U.S. Pat. No. 9,008,386 of the present applicant where a workstation that contains a simulation of a 2D X-ray Angiography image based on a CT data is disclosed. In this prior art document, the simulation of the 2D X-ray angiography image is based on calculating the intensity of each pixel of the 2D image from the full 3D volumetric image, i.e. the CT data.

Such calculation of pixel intensity from 3D voxel dataset to simulate a 2D shadow image requires access to a relatively large amount of data and takes a significant amount of computer processing power that might be time-consuming even when done in parallel on a graphic processing unit (GPU).

For acceptable performance on low-end hardware, and in general where there is limited calculation power and lack of possible use of parallel calculations, e.g. no, or limited GPU, the technique according to the prior art will be slow and impractical for interactive application. For instance, on mobile devices, the processing power and the amount of system memory are limited, and the (wireless) network bandwidth to transfer large 3D volumetric dataset to the device may not be feasible. Even more, when dynamic visualization is required and all 3D volumetric image data over time is available, generating a dynamic simulated 2D X-ray angiographic image, which simulated cardiac motion at an acceptable framerate, may not be feasible with the available computation power. A fast technique that simulates a 2D X-ray angiographic image, using less data and at the same time providing high-quality images would provide 2D X-ray angiographic simulations on a much wider range. This is even more evident now that physicians require access and interaction with image data preferably at all time and places.

There's thus the need for a method which is fast and based on limited calculation effort and that can be used by low-end hardware to simulate a 2D X-ray angiographic image without accessing the full 3D volumetric image.

SUMMARY

It is thus an object to provide a method for calculation and visualization of shadow images without the need to have access to the original data such as the 3D volumetric image data that contains information on all voxels in the volume of interest.

In accordance with embodiments herein, systems, computer program products and computer implemented methods are provided for simulating two-dimensional (2D) shadow images of an object, the systems, program products and methods comprising, under control of one or more computer systems configured with specific executable instructions:

a) obtaining a representation of the surface of said object, typically in the form of meshes, particularly triangular meshes;

b) inputting a perspective viewing direction defining a virtual path line;

c) calculating intersections between the virtual path line and the surface of the object;

d) calculating the distance between couples of consecutive intersections;

e) calculating simulated beam intensity attenuation between such couples of consecutive intersections from an input parameter related to the attenuation coefficient of the object and the distance as calculated in d); and f) displaying the simulated beam intensity attenuation as pixel brightness in a grey or colour scale in the form of a shadow image.

The shadow image, instead of being calculated from the 3D volumetric data, is advantageously calculated from the 3D mesh data that resulted from segmentation of the 3D data. This decreases the need for transferring and processing large data volumes of 3D volumetric image data thus allowing this technique to be used on a wide range of (mobile) devices that are equipped with less memory. The surface meshes are small enough to be easily transferred over the internet (i.e. mail) and stored on these devices, which is typically a lot harder with 3D volumetric data.

This surface could be a triangle mesh. Triangle meshes can be obtained from volumetric images and segmentations, for instance using the Marching cubes algorithm. See, for example, William E. Lorensen, Harvey E. Cline: "Marching Cubes: A high resolution 3D surface construction algorithm". In: Computer Graphics, Vol. 21, Nr. 4, July 1987). Triangle meshes are also a format directly supported by 3D hardware accelerator card.

On a 2D X-ray angiogram blood vessels stand out from the background because the contrast in the blood vessel is causing them to be visualized as darker structures. They are darker because the contrast agent in the blood attenuates the X-rays passing through more than the in the surrounding tissue.

If a segmentation of the blood vessels is available as a closed surface as for example shown in FIG. 2a, this may be used to simulate the effect of a real 2D X-ray angiographic image on a contrast enhanced blood vessel as shown in FIG. 2b.

Angiographic simulation according to embodiments herein can be used to get a preview of what the patient's blood vessels will look like when examined using X-rays, for instance in a catheterization laboratory or during procedure preparation to help to choose the best viewing perspective of the X-ray scanner for the procedure. The simulation does not need to be exact: the grey levels cannot be entirely predicted as they depend on (amongst others) the amount of contrast agent injected during the procedure. It is however advantageous if they show the effect when vessels overlap occurs.

The method is typically performed by a data processing system with access to surface meshes of an object of interest anyhow obtained.

Embodiments also relate to a computer product directly loadable into the memory of a computer and comprising software code portions for performing the method as disclosed above when the product is run on a computer.

Further embodiments relate to a computing device for providing simulated two-dimensional (2D) shadow images of an object, particularly an asymmetrical object, the device comprising:
  a communications interface configured to obtain a representation of the surface of the object;
  an input unit for receiving a perspective viewing direction defining a virtual path line;
  memory storing program instructions;
  a processor configured to execute the program instructions to:
    calculate intersections between the virtual path line and the surface of the object,
    calculate the distance between couples of consecutive intersections,
    calculate simulated beam intensity attenuation between such couples of consecutive intersections from a parameter related to the attenuation coefficient of the object and the distance as calculated, and
    display the simulated beam intensity attenuation as pixel brightness in a grey or colour scale in the form of a shadow image.

Embodiments also relate to a system for providing simulated two-dimensional (2D) shadow images of an object comprising a workstation having:
  a communications interface configured to obtain volumetric data of the object;
  memory storing program instructions;
  a processor configured to execute the program instructions to:
    determine from the volumetric representation a surface mesh of the object, and
    store the surface mesh in a repository; and
  a device according to embodiments herein, wherein the communications interface of the device is configured to obtain a representation of the surface of the object from the repository.

Further improvements will form the subject of the dependent claims.

BRIEF DESCRIPTION OF THE DRAWINGS

The characteristics of the invention and the advantages derived therefrom will be more apparent from the following description of non-limiting embodiments, illustrated in the annexed drawings.

FIG. 1a is a real 2D X-ray angiographic image of a blood vessel; FIG. 1b is a simulated X-ray angiographic image obtained using 3D volumetric CT data according to the prior art; FIG. 1c is a simulated 2D X-ray angiography obtained using a surface mesh according to embodiments herein.

FIG. 2b shows a simulating 2D X-ray angiography image obtained using the surface mesh of FIG. 2a.

DETAILED DESCRIPTION OF A PREFERRED EMBODIMENT

Figure 1C:
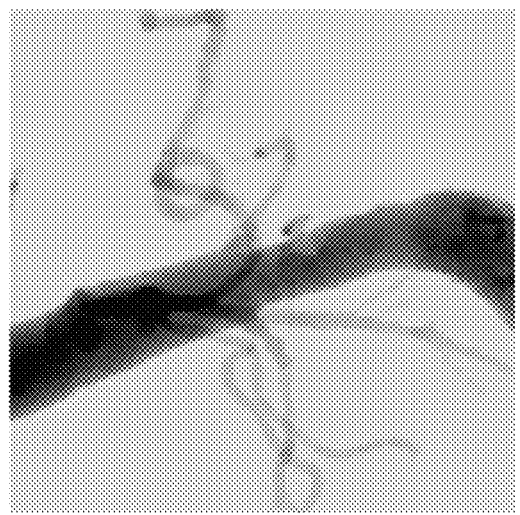
FIGS. 1a-1c show a sequence of three images.
Figure 1B:
Figure 1A:
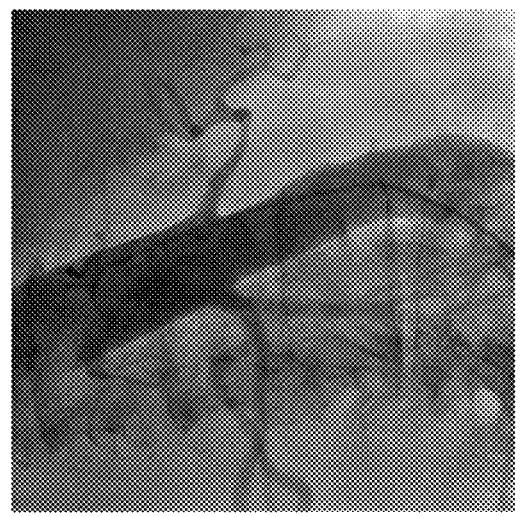
Figure 2B:
Figure 2A:
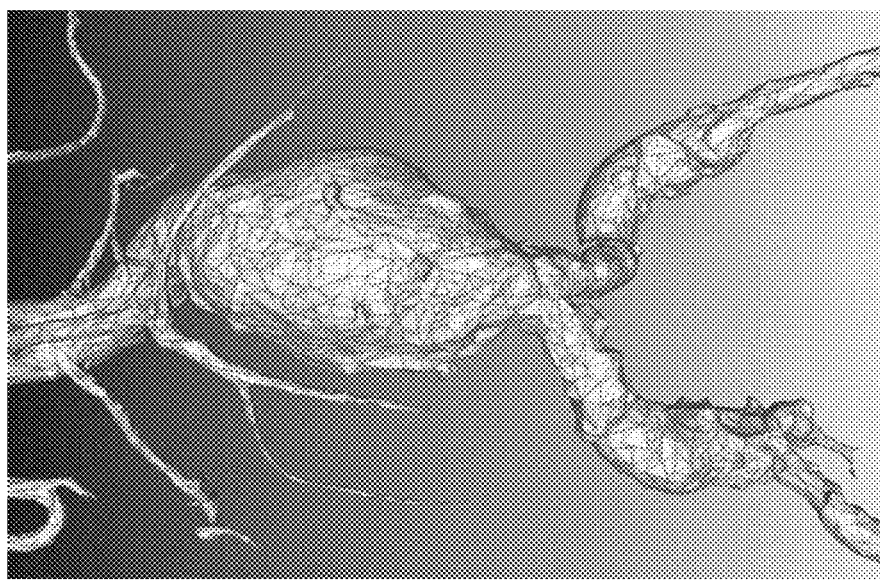
FIG. 2a shows a triangular mesh of an aortic aneurism segmented from 3D CT data.

An angiographic image visualizes the attenuation of an X-ray beam through an object under scrutiny. No attenuation (vacuum, air) is rendered white, high attenuation (bone, metal, contrast agent) is rendered as dark grey or black. The longer the X-ray travels through highly absorbing material, the darker the image becomes. An example of such an angiographic image is shown in FIG. 1a.

Figure 6:
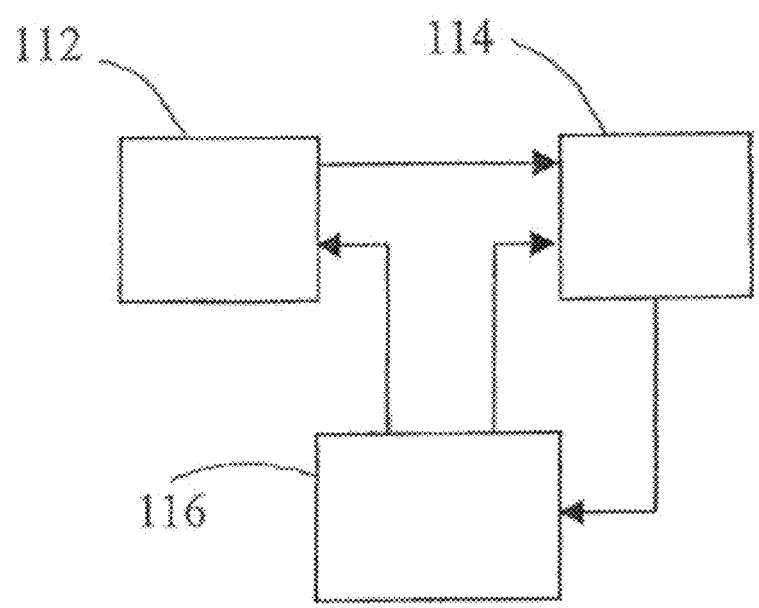
FIG. 6 shows a functional block diagram of an exemplary single plane angiographic system.

FIG. 6 is a functional block diagram of an exemplary single plane angiographic system capable of obtaining angiographic images. The system includes an angiographic imaging apparatus 112 that operates under commands from user interface module 116 and will provide data to data processing module 114. The single plane angiographic imaging apparatus 112 captures a two-dimensional X-ray image of the vessel organ of interest for example in the postero-anterior (PA) direction. The single plane angiographic imaging apparatus 112 typically includes an X-ray source and detector pair mounted on an arm of a supporting gantry. The gantry provides for positioning the arm of the X-ray source and detector at various angles with respect to a patient who is supported on a table between the X-ray source and detector. The data processing module 114 may be realized by a personal computer, workstation or other computer processing system. The data processing module 114 processes the two-dimensional image captured by the single plane angiographic imaging apparatus 112 to generate data as described herein. The user interface module 116 interacts with the user and communicates with the data processing module 114. The user interface module 116 can include different kinds of input and output devices, such as a display screen for visual output, a touch screen for touch input, a mouse pointer or other pointing device for input, a microphone for speech input, a speaker for audio output, a keyboard and/or keypad for input, etc.

While angiography systems are capable of acquiring bi-dimensional images lacking information that describes the object as a function of position in the space between the X-ray source and detector plane, modalities like computed tomography (CT) or Magnetic Resonance imaging (MRI) produce full three-dimensional (3D) volumetric datasets, i.e. voxels that cover a 3D volume.

Embodiments provide for obtaining a shadow image, simulating an angiographic image taken with an angiography system, from a three-dimensional representation of the surface of an object, in the present disclosure also called rendered surface or mesh or mesh data. Such rendered surfaces can be derived from volumetric datasets originating from any acquisition system including also 3D QCA reconstructions where the meshes originates from originally 2D image sets as, for instance, taught in "A novel dedicated 3-dimensional quantitative coronary analysis methodology for bifurcation lesions", Yoshinobu Onuma, Chrysafios Girasis, Jean-Paul Aben, Giovanna Sarno, Nicolo Piazza, Coen Lokkerbol, Marie-Angel Morel, Patrick W. Serruys, EuroIntervention 2011; 6:1-00.

Figure 4:
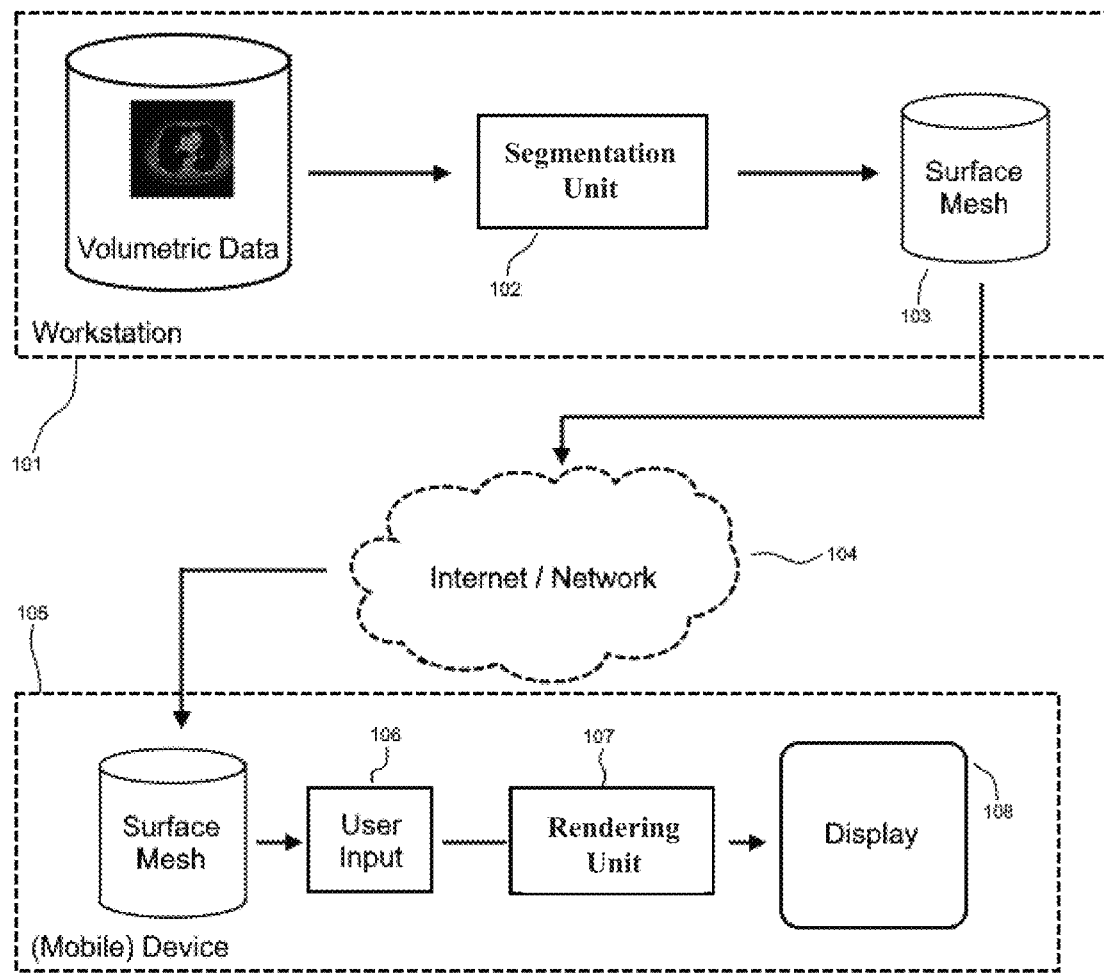
FIG. 4 shows a functional block diagram of a system according to embodiments herein.

In the upper part of FIG. 4, the block diagram of a workstation 101 capable of obtaining surface mesh 103 from volumetric data via a segmentation unit 102 is schematically depicted. The workstation comprises memory storing program instructions and one or more processors configured to execute the program instructions to read volumetric data of an object and perform a segmentation operation via the segmentation unit 102. In X-ray, for example, this can be done following the teachings of US2010/021025 by connecting separately reconstructed bifurcations models to form a 3D tree. As another example in MRA this can be achieved as disclosed in "Model-Based Segmentation Of Cardiac And Vascular Images", W J Niessen, proceedings of IEEE international symposium on biomedical imaging 2002, pp 22-25. Still another example, in ultrasound this can be achieved as in U.S. Pat. No. 6,251,072. Yet another example, in CTA this can be achieved as in "Robust CTA lumen segmentation of the atherosclerotic carotid artery bifurcation in a large patient population", Manniesing et al, Medical Image Analysis 14 (2010), pp. 759-769.

Once the object is segmented, i.e. a 3D model is calculated, at 103 the processor can calculate and store in a repository a surface mesh of that model as taught, for example, in William E. Lorensen, Harvey E. Cline: "Marching Cubes: A high resolution 3D surface construction algorithm". In: Computer Graphics, Vol. 21, Nr. 4, July 1987).

Figure 5:
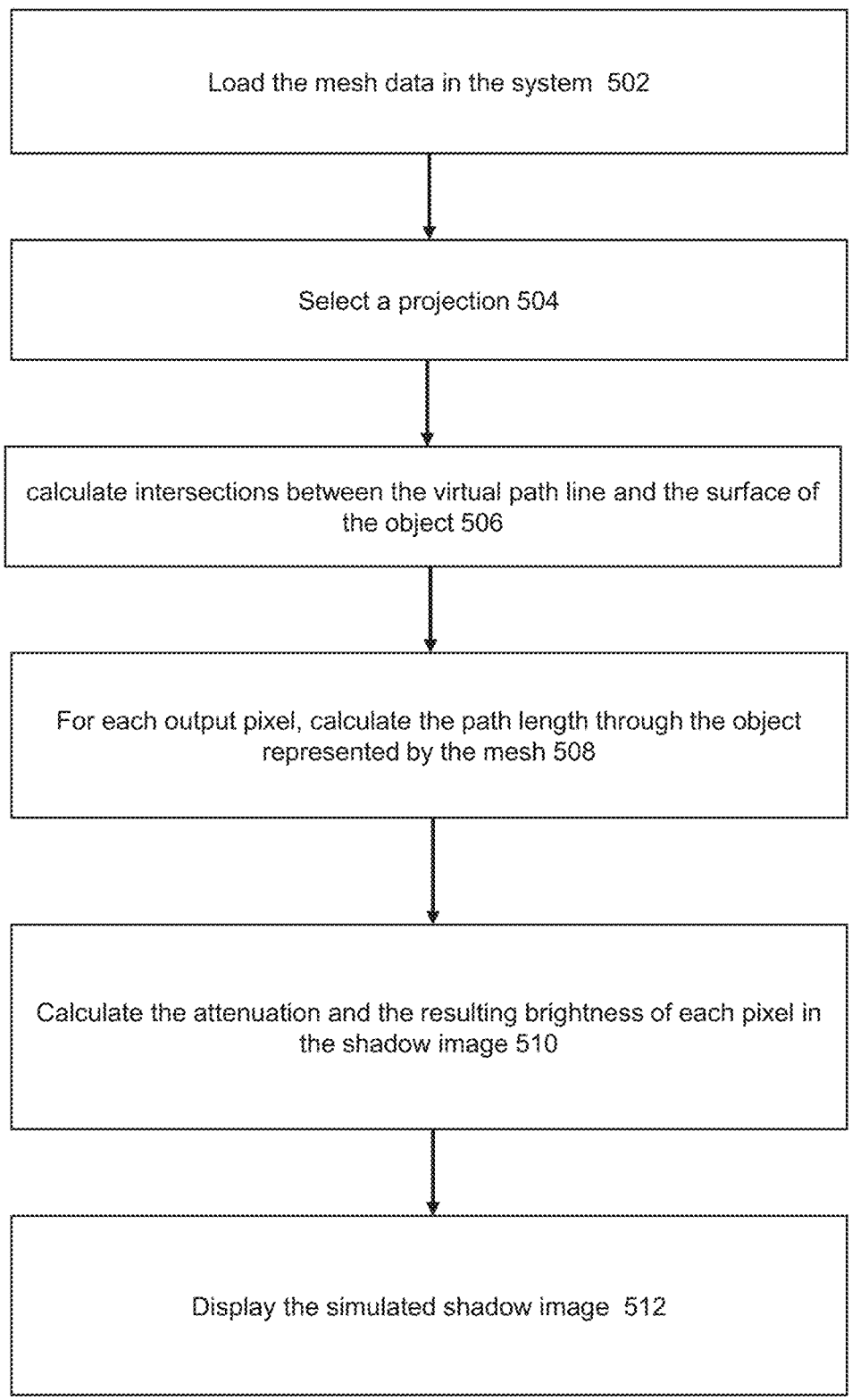
FIG. 5 shows a flowchart according to embodiments herein.

A computing device, like a mobile device, a smartphone, a PDA, a portable computer or the like, can thus read the rendered surface of the object from such a repository by a communication network 104 (for example by email, cloud connection, etc.) and further elaborate to calculate simulated shadow images according to embodiments herein. The device 105, exemplary shown in the bottom part of FIG. 4, comprises:

a communications interface 104 configured to obtain a representation of the surface of the object;

an input unit 106 for receiving a perspective viewing direction defining a virtual path line;

a rendering unit 107 comprising:
memory storing program instructions,
a processor configured to execute the program instructions to perform the operations as disclosed in the flowchart of FIG. 5, namely:
at 502, load the mesh data in the system,
at 504; select a perspective viewing direction defining a virtual path line,
at 506, calculate intersections between the virtual path line and the surface of the object,
at 508; calculate the distance between couples of consecutive intersections,
at 510, calculate simulated beam intensity attenuation between such couples of consecutive intersections from a parameter related to the attenuation coefficient of the object and the distance as calculated, and
at 512, display the simulated beam intensity attenuation as pixel brightness in a grey or colour scale in the form of a shadow image.

The operations of FIG. 5 can also be carried out by software code that is embodied in a computer product (for example, an optical disc or other form of persistent memory such as a USB drive or a network server). The software code can be directly loadable into the memory of a data processing system for carrying out the operations of FIG. 5.

The simulated beam attenuation between couples of consecutive intersections is calculated by the processor of the rendering unit 107 preferably from equation $$I_{remaining} = I_0(1-\mu)^d \quad (1)$$

where $I_0$ is the intensity of a simulated reference beam crossing the object, $\mu$ is the attenuation coefficient of the material forming the object, i.e. the proportion of beam intensity lost while traveling through an unitary length material, and 'd' is the distance travelled by the beam in the object between couples of consecutive intersections. In an embodiment, the attenuation coefficient $\mu$ is assumed constant between couples of consecutive intersections used for calculating the distance d.

Equation (1) is best explained by an example: let's suppose to have n slabs of material with an attenuation of 0.5. After each slab, the beam intensity is halved, so after n slabs, the remaining intensity has been halved n times, so the remaining intensity is 0.5n. This relation also holds for fractional values of n.

In human tissue, the attenuation varies from tissue to tissue. The remaining intensity should be calculated by integrating equation 1. In most tissue the attenuation is quite uniform and adds little information to the image. Exceptions are contrast enhanced blood vessels and dense bone. By segmenting the high density structures of interest, and applying equation 1 to calculate the beam intensity, a segmentation of the blood vessels are rendered from arbitrary view directions. The contrast in the blood vessels can be assumed to be homogenous, so the attenuation of the blood is constant. The remaining problem is to calculate the beam distance 'd' travelled inside the blood vessel and then apply equation 1.

This distance is straightforward to calculate if there are only two intersections with the closed surface: one intersection going in, and one going out. The distance travelled inside the mesh is the distance between these two points.

An X-ray angiographic image simulation can be calculated from an arbitrary view direction, in a perspective projection as well as a parallel projection. In a perspective projection the simulated rays start in the simulated X-ray source and end at the pixel position in the detector. In a parallel projection the rendered X-rays are all parallel.

For each ray, also called virtual path line, the processor first calculates the path length through the object and then the brightness of a pixel using equation 1. The simulated X-ray angiographic image is built in such way that low attenuation results in bright pixels and high attenuation results in dark pixels to mimic a 2D X-ray angiographic image.

In general, surface meshes can have multiple intersections with a given ray. If the mesh is closed, there is always an even number of intersections with a virtual path line: For each time the ray goes from the outside to the inside of the mesh, there will be an intersection going from the inside to the outside of the object of interest. In equation (2), the calculated depth was written to a buffer. Note that multiple intersections can be handled if the calculated depth is added to the buffer as follows:

$$\text{buffer}_{x,y} = \text{buffer}_{x,y} + D_{triangle}(x,y) \quad (2)$$

In this case, the difference between the front and back buffer value is now the sum of the path length inside the volume enclosed by the surface.

Simply summing the total path length is in fact desired, as for an angiographic simulation, only the cumulative length of the ray inside the surface matters. E.g. two vessels of 5 mm in the virtual path line will result in the same pixel brightness as one 10 mm vessel. (FIG. 4 bifurcation)

When implementing this technique on a GPU with potentially limited capacity (common on mobile devices), it may occur that images are limited in bit depth (e.g. GPU with 4 channels, 8 bit per channel) which results in limited dynamic range.

The described technique can then still be applied, but the original signal (for instance a 20 bit path length value) is advantageously split in 4 values of 5 bits each. It turns out that the additive blending method can simply be performed in the original texture channels. When the final pixel brightness is calculated, the bits from all the channels are combined and due to the blending the original 5 bits per channel may have become a 7 or 8 bit number. For details on this technique, refer to chapter four of the "OpenGL Programming Guide, eight edition, The official guide to learning OpenGl version 4.3" by Dave Shreiner.

In case the surface description is not a triangular mesh, but something else (for instance a B-spline surface), two options are available for rendering the surface:

1. Convert the surface to a triangular mesh and follow the steps for a triangular mesh.
2. Render the surface representation directly (for instance using a modified ray tracer). Similar to triangular meshes, the surface depth can be calculated while rendering.

Besides simulation of only one object of interest, e.g. contrast fluid in vessels, other tissue objects which were segmented in the 3D volumetric dataset and made available as an object with a surface, e.g. calcified plaque, soft plaque, bones etc. can be added to the visualization. Objects that represent different tissue that needs to be identifiable, have different attenuation coefficients. In this way the pixel brightness of these different objects in the simulated image will differ. Proper selection of the attenuation coefficient will optimize the visualization. This can result in simulated 2D X-ray angiographic image that contain more information than can be visualized in the real 2D X-ray angiographic image and could e.g. be used in the treatment of chronical total occlusions of arteries or veins.

Furthermore, by making selection of subsets in the meshed data possible, it becomes possible to visualize selected vessel trees in a 3D volume that originally holds multiple of such vessel trees (e.g. left coronary artery in complete scan with all coronaries and hearth cavities) or a specific heart cavity without surrounding vessels (e.g. the left ventricle).

Besides density information, the mesh may be used to calculate additional information e.g. to color coded shadow images where the color indicates e.g. the foreshortening of the simulated image of the object in the selected imaging projection/viewing direction. To enable such foreshortening information the centerline in the object defined by the mesh structure can be calculated with adequate algorithms outside such as those disclosed in U.S. Pat. No. 8,787,641.

Another example of visualization of additional information in the simulated shadow image can be provided when based on information on the dimensions of the object also other information such as pressure drop or wall shear stress over an obstruction in a tubular object is made available.

To save memory and render passes, the render passes for the triangular meshes can be configured to render to the same output buffer, with opposing signs for front and back. One may also render all triangles in a single pass, with different handling for front and back facing triangles.

When rendering additional X-Ray simulated structures, the render buffers can be shared. When the attenuation factors differ, this can be corrected for by multiplying the depth with a constant that compensates for the difference in attenuation factor.

To correctly mimic 2D X-ray angiographic imaging, X-ray detector non-linearity and the display LUT applied by the imaging modality can be advantageously taken into account. As not all of these are known, a simple linear or logarithmic attenuation from the original image as a function of the depth 'd' provides useful results. The attenuation factor may be under end-user control, when the mesh is rendered in real time, the user can change the attenuation factor until it resembles the images from the X-Ray device. This is important, because the clarity on the image depends on the attenuation coefficient and the user can change the image such that the relevant anatomy is clear to see.

It will be clear to a person skilled in the art that the sequence of operations to calculate projected path length and related pixel brightness can be changed and that other methods to calculate the length can be used.

In case of dynamic sets of 3D volume data were available, also dynamic simulations can be produced based on surface information that changes over time by repeatedly calculating the pixel brightness for each new set of mesh. E.g. to simulate a dynamic image of a coronary artery due to the cardiac cycle.

Figure 3A:
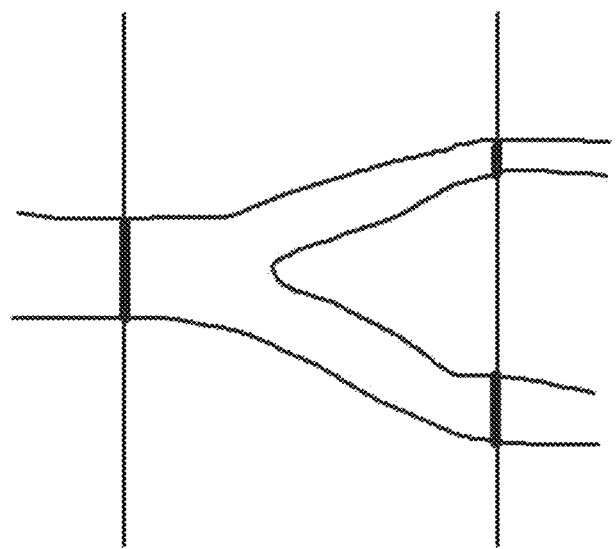
FIGS. 3a-3b show how two branches of a bifurcation within the same viewing plane (FIG. 3a) results in the same intensity within X-ray angiography (FIG. 3b).
Figure 3B:
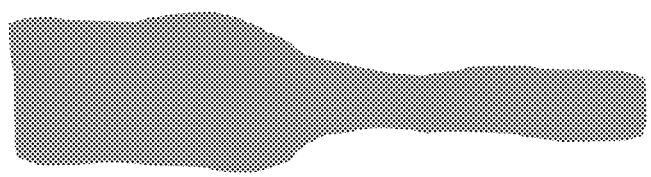

Since simulated X-ray angiographic is often used to find viewing directions (projection) for the X-ray device that give the least amount of overlap between structures, the rendering could be extended to inform the viewer of the amount of overlap. As seen in FIG. 3, without changing the projection it is not possible to see the difference between one thick structure and two smaller overlapping structures. To mitigate this, the visualization could be extended to change the color of the shadow image when the amount of overlap increases.

The fused image (superposition of color information) can also visually indicate when a vessel is not parallel to the detector: such as render the centerline in a distinctive color when the projected vessel length is less than (for example) 95% of the actual vessel length.

There have been described and illustrated herein several embodiments of a method and apparatus for determining optimal image viewing direction in terms of reduced foreshortening and relevancy of information. While particular embodiments of the invention have been described, it is not intended that the invention be limited thereto, as it is intended that the invention be as broad in scope as the art will allow and that the specification be read likewise. For example, the data processing operations can be performed offline on images stored in digital storage, such as a picture archiving and communication system (PACS) commonly used in the medical imaging arts. It will therefore be appreciated by those skilled in the art that yet other modifications could be made to the provided invention without deviating from its spirit and scope as claimed.

The embodiments described herein may include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. Method for simulating two-dimensional (2D) shadow images of an object, the method comprising:
   a) obtaining a three-dimensional representation of a surface of said object;
   b) inputting a perspective viewing direction defining a virtual path line;
   c) calculating intersections between the virtual path line and the surface of the object;
   d) calculating a distance between couples of consecutive intersections of c);
   e) calculating a simulated beam intensity attenuation between such couples of consecutive intersections from an input parameter related to the attenuation coefficient of the object and the distance of d); and
   f) displaying the simulated beam intensity attenuation of e) as pixel brightness in a grey or colour scale in the form of a shadow image.

2. Method according to claim 1, wherein the object is an asymmetrical object.

3. Method according to claim 1, wherein the simulated beam attenuation of e) is calculated from the equation $$I_{remaining} = I_0(1-\mu)^d$$

where $I_0$ is the intensity of a simulated reference beam crossing the object, $\mu$ is the attenuation coefficient of the material forming the object, and exponent d is a distance traveled by the beam in the object between couples of consecutive intersections.

4. Method according to claim 3, wherein the attenuation coefficient $\mu$ is assumed constant between couples of consecutive intersections used for calculating the exponent d.

5. Method according to claim 1, wherein the three-dimensional representation of the surface of the object is a triangular mesh.

6. Method according to claim 1, wherein, if the three-dimensional representation of the surface of the object is not a triangular mesh, the method further comprises converting the three-dimensional representation of the surface of the object to a triangular mesh or rendering the three-dimensional representation of the surface of the object directly.

7. Method according to claim 1, further comprising simulating shadow images of multiple objects of interest, wherein input parameters related to the attenuation coefficient of the objects are received.

8. Method according to claim 1, wherein subsets of the three-dimensional representation of the surface of the object are processed to simulate part of a human anatomy.

9. Method according to claim 1, wherein the three-dimensional representation of the surface of the object is processed to calculate further information.

10. Method according to claim 9, wherein such information comprises centerlines of vessels and/or colorization of shadow images to indicate amount of foreshortening or pressure drops in vessels or wall shear stress.

11. Method according to claim 1, further comprising simulating dynamic two-dimensional (2D) shadow images based on surface information that changes over time.

12. Non-transitory computer readable medium stores computer program for causing a computer to execute a method for simulating two-dimensional (2D) shadow images of an object, the method comprising:
   a) obtaining a three-dimensional representation of a surface of said object;
   b) inputting a perspective viewing direction defining a virtual path line;
   c) calculating intersections between the virtual path line and the surface of the object;
   d) calculating a distance between couples of consecutive intersections of c);
   e) calculating a simulated beam intensity attenuation between such couples of consecutive intersections from an input parameter related to the attenuation coefficient of the object and the distance of d); and
   f) displaying the simulated beam intensity attenuation of e) as pixel brightness in a grey or colour scale in the form of a shadow image.

13. A computing device for providing simulated two-dimensional (2D) shadow images of an object, the device comprising:
   a communications interface configured to obtain a three-dimensional representation of a surface of the object;
   an input device for receiving a perspective viewing direction defining a virtual path line;
   memory storing program instructions;
   a processor configured to execute the program instructions to:
      i) calculate intersections between the virtual path line and the surface of the object,
      ii) calculate a distance between couples of consecutive intersections of i),
      iii) calculate a simulated beam intensity attenuation between such couples of consecutive intersections from a parameter related to the attenuation coefficient of the object and the distance of ii), and
      iv) display the simulated beam intensity attenuation of iii) as pixel brightness in a grey or colour scale in the form of a shadow image.

14. The computing device of claim 13, wherein the communications interface is configured to receive a surface mesh of the object from a repository.

15. The computing device of claim 13, wherein the communications interface is configured to receive a surface mesh of the object via a communication network.

16. The computing device of claim 13, further comprising a buffer memory to accumulate distance between couples of consecutive intersections to obtain a total path length.

17. The computing device of claim 13, wherein the processor is part of a Graphical Processing Unit (GPU) configured to elaborate in parallel processing channels split distance values having a reduced number of bits and blend the result of each elaboration channel to obtain a path length value.

18. A system for providing simulated two-dimensional (2D) shadow images of an object comprising a workstation and a computing device,
wherein the workstation has:
a communications interface configured to obtain volumetric data of the object,
memory storing program instructions, and
a processor configured to execute the program instructions to determine a three-dimensional representation of a surface of the object from the volumetric data of the object, and store the three-dimensional representation of the surface of the object in a repository;
wherein the computing device has:
a communications interface configured to obtain the three-dimensional representation of the surface of the object from the repository,
an input unit for receiving a perspective viewing direction defining a virtual path line,
memory storing program instructions,
a processor configured to execute the program instructions to:
i) calculate intersections between the virtual path line and the surface of the object;
ii) calculate a distance between couples of consecutive intersections of i);
iii) calculate a simulated beam intensity attenuation between such couples of consecutive intersections from a parameter related to the attenuation coefficient of the object and the distance of ii); and
iv) display the simulated beam intensity attenuation of iii) as pixel brightness in a grey or colour scale in the form of a shadow image.

19. The system of claim 18, wherein the processor is further configured to perform segmentation of the object based on the volumetric data of the object.

20. The system of claim 19, wherein the processor is configured to determine the three-dimensional representation of the surface of the object from the segmentation of the object.

* * * * *